A. J. ARBUCKLE.
FEED AND DISTRIBUTING MEANS FOR SEPARATORS.
APPLICATION FILED MAR. 19, 1910.

1,030,271.  Patented June 25, 1912.

Witnesses:
Chas. Ovendale
F. Ovendale

Inventor:
Alexander John Arbuckle

UNITED STATES PATENT OFFICE.

ALEXANDER JOHN ARBUCKLE, OF JOHANNESBURG, TRANSVAAL.

FEED AND DISTRIBUTING MEANS FOR SEPARATORS.

1,030,271. Specification of Letters Patent. Patented June 25, 1912.

Application filed March 19, 1910. Serial No. 550,386.

*To all whom it may concern:*

Be it known that I, ALEXANDER JOHN ARBUCKLE, a subject of the King of Great Britain, and resident of Johannesburg, Transvaal, have invented certain new and useful Improvements in Feed and Distributing Means for Separators, of which the following is a specification.

This invention relates to means for introducing and distributing mixtures of solids and liquid in settling or other vats or vessels.

Although my invention has been primarily designed for use in vats employed in the treatment of crushed ore products for separating such products from cyanid solutions, water or other liquid, it may be utilized in vessels intended for settling or separating the solids from the liquid of other mixtures or fluid masses, particularly when the solids are in a fine state of division and as a consequence are readily influenced or prevented from settling by the motion of their containing liquid.

The object of the invention is to effect the introduction and distribution of the feed mixture or pulp within the vat or vessel in such a manner that the settlement of the solid component of the mixture or pulp can take place continuously while said solid component and also the liquid component are being continuously and separately withdrawn. To this end the means are so constructed as to prevent the incoming stream or streams of the feed mixture or pulp from violently agitating the entire contents of the vat or vessel; and to concentrate or collect the heavier solids as soon as possible and deliver or convey them to the lower regions of the vat or vessel, and thereby prevent their redispersal in the separated liquid contents of said vat or vessel.

The invention will be described by aid of the accompanying drawing, in which I show it adapted to an ordinary conical settling vessel such as is in common use for the treatment of crushed auriferous ore products.

Figure 1:
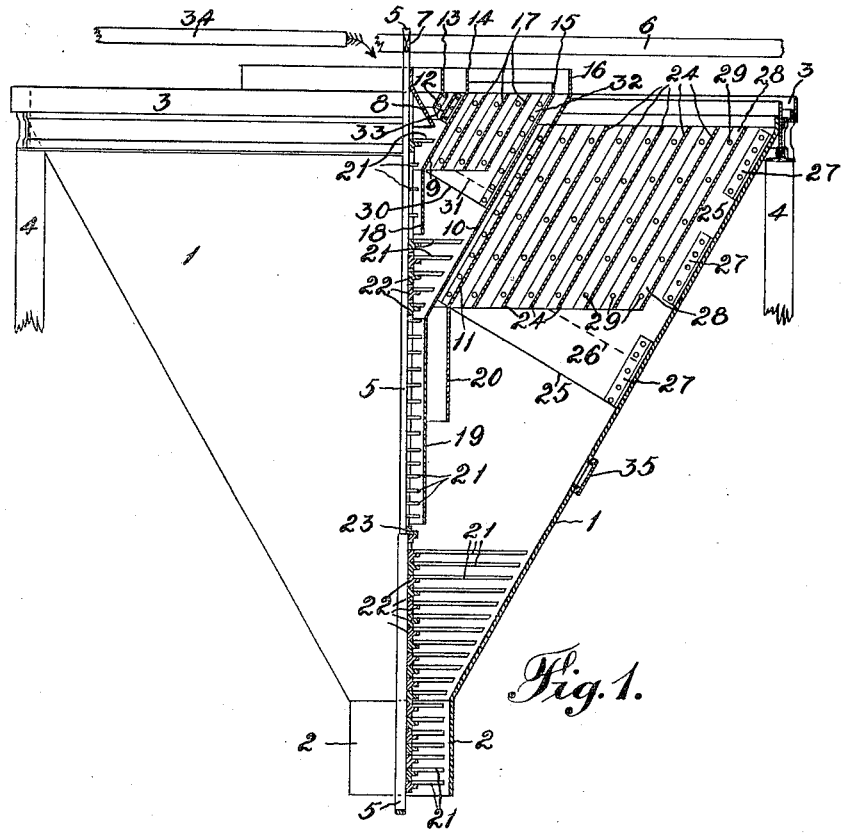
Figure 2:
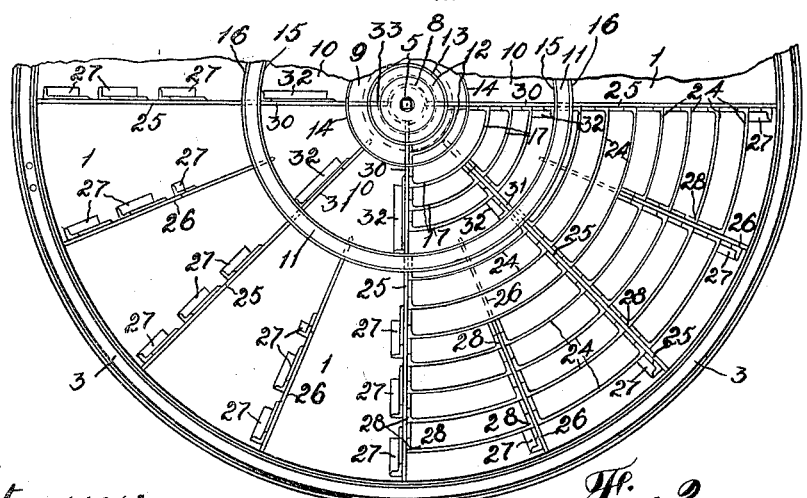

In the drawing Figure 1 is an elevation of the vat or vessel showing one half in section. Fig. 2 is a plan of portion of the vat or vessel showing the manner of supporting the means for introducing and distributing the pulp or mixture.

The settling vessel 1 is in the form of an inverted, truncated, conical vat terminating at the bottom in a cylindrical part 2 which provides the outlet for the settled solids. The vat 1 is constructed around the top with an annular overflow or rim launder 3, which serves for receiving the overflowing clear liquid. Vat 1 is shown supported by posts or uprights 4.

5 is a vertical shaft disposed centrally of the vat 1; and 6 is a beam for carrying bearing 7 for the upper end of shaft 5. To the upper end of shaft 5 inside the vat 1 is fixed an upright and preferably hollow cone 8. The top of cone 8 is shown approximately on the same level as the outer edge of the rim launder 3. Surrounding cone 8 is a larger, inverted, truncated cone 9; and surrounding inverted, truncated cone 9 is another and larger, inverted, truncated cone 10; 11 being a further and still larger, inverted, truncated cone surrounding cone 10.

In the space formed between the upright cone 8 and the inverted cone 9 are arranged a number (two are shown) of shallower inverted, truncated, concentric cones or conical rings 12. The conical rings 12 constitute baffles and at the same time provide settling surfaces for the solids of the incoming stream or streams of pulp or feed mixture. Between the outside of upright cone 8 and the lower ends of rings 12 a passage is formed leading to the underside of the cone 8 and the bottom of cone 9. Passages are also formed between the conical rings 12 and the outer ring 12 and the inverted cone 9.

Around the upper end of the innermost conical ring 12 and around the upper ends of cones 9, 10 and 11, are provided vertical, upward, cylindrical extensions 13, 14, 15, 16. The extensions 13, 14, 16 are carried up to the same height or level; while extension 15 on cone 10 terminates at a level some distance below the top of extensions 13, 14, 16.

Between cones 9 and 10 is arranged a plurality (I show three) of inverted, truncated, concentric and equi-distant cones 17 which also constitute settling surfaces for the solids, and provide passages between them.

Each of the cones 9, 10 and 11, is constructed with a cylindrical, vertical, downward extension 18, 19, 20 respectively. The lower end of extension 20, as shown, preferably terminates at a point some distance above the lower end of extension 19.

To the rotary shaft 5 are attached a number of radial, helically disposed arms or blades 21. These arms or blades commence at a point some distance below the cone 8 and continue to the outlet for the solids provided in the bottom of cylindrical part 2. Blades 21 may be fashioned in one piece with or suitably attached to bosses or hub members 22; and the latter serve as distance pieces between the arms or blades. The arms or blades operate upon rotation of shaft 5 to force or convey the solids to the opening at the bottom of the vat. The arms or blades 21 in the cone 9 and its extension 18 deliver any solids that settle in said cone to the arms or blades 21 operating in the lower portion of cone 10 and its extension 19, said latter arms or blades thereafter delivering said solids together with any that settle in cone 10 to the arms or blades 21 which operate in the lower portion of vat 1. The arms or blades 21 operating in the lower portion of vat 1, deliver the solids conveyed to it through extension 19 together with any solids that settle in vat 1 through the outlet at the bottom of the latter.

The shaft 5 may, as shown, be constructed in two (more or less) parts connected by suitable couplings as indicated at 23.

In the drawing I show the vat 1 fitted with a plurality (seven are shown) of inverted truncated, concentric and equi-distant settling cones 24 arranged in the upper portion thereof and in the space between the cone 11 and the interior walls of vat 1, as described in the specification of a prior application for patent made by me on November 13th, 1909, Serial Number 527929.

The solid particles which settle and accumulate upon the upper surfaces of any of the cones ultimately slide off said surfaces and fall to the bottom of the vessel being removed therefrom by the spirally disposed arms or blades 18, as hereinbefore explained.

The several truncated cones 9, 10, 11, conical rings 12, truncated settling cones 17 and truncated settling cones 24 are all supported inside the vessel by means of radial wing or carrying plates.

For carrying the seven truncated, settling cones 24 and the truncated cones 10 and 11, I provide eight wide and eight narrow wing plates 25, 26, respectively. These are fixed to the inside of vat 1 by means of the angle irons 27. The four outer truncated cones 24 are constructed in sixteen sections flanged at their ends, as indicated at 28, and riveted through said flanges to the wing plates 25, 26, as indicated at 29. The other three inner and smaller truncated settling cones 24 are constructed of eight similar flanged sections secured in like manner to the wing plates 25.

For carrying the truncated settling cones 17, I provide four wide and four narrow wing plates 30, 31, respectively. These wing plates are fixed to the inside of cone 10 at the top by means of the angle irons 32. The two outer truncated cones 17 are constructed in eight sections flanged at their ends and riveted to the wing plates 30, 31, in like manner to the cones 24. The other truncated settling cone 17 is constructed of four similar flanged sections secured in the same manner to the wide wing plates 30. The conical rings 12 are constructed in four sections having external flanges at the ends through which they are riveted to wing plate 33.

34 represents a pipe or launder for conveying the pulp or feed mixture to vat 1. Pipe or launder 34 is arranged to deliver said feed mixture between the upper end of cone 8 and the extension 13 of inner conical ring 12.

35 is a manhole door or cover for giving access to the interior of vat 1 below the lower ends of settling cones 24.

Any desired number of truncated settling cones may be provided between cones 8 and 9 or 9 and 10 or 11 and the interior walls of vat 1.

The action of the apparatus is as follows:—The feed mixture, which as previously stated is delivered between cone 8 and the vertical upward extension 13 of the inner conical ring 12, passes through the passage formed between the lower ends of said conical rings and cone 8 to the bottom of cone 9, then down under the lower edge of cylindrical extension 18 into cone 10. Any solids which settle in cone 9 are conveyed by the helically disposed arms or blades 21 through extension 18 into cone 10. The mixture entering cone 10 then flows in an upward direction through the conical passages formed between truncated cones 17 and over upward extension 15 of cone 10, to the conical passage formed between cones 10 and 11. Any solids deposited upon the surfaces of settling cones 17 slide off the latter to the bottom of cone 10 whence they are conveyed together with the solids entering said cone through extension 18 through extension 19 to the lower regions of the vat 1. The mixture which flows down the conical passage formed between cones 10 and 11 flows under the lower end of extension 20 into vat 1 to below the settling cones 24. The mixture then flows upwardly through the conical passages formed between the settling cones 24, the clear liquid ultimately entering rim launder 3. Any solids which settle and accumulate upon the settling cones 24 ultimately fall off to the bottom of the vat 1 whence they are conveyed to the outlet at the bottom by means of the helically disposed arms or blades 21 together with the solids conveyed through extension 19 to the lower portion of the vat.

What I claim as my invention and desire to protect by Letters Patent is:—

1. In means for introducing and distributing mixtures of solids and liquid in settling or other vats or vessels, the combination with the vat or vessel, of an inner inverted cone arranged in the upper portion of the vessel and provided with a downward extension, an upright cone arranged inside said inner inverted cone and forming at its base an annular passage leading to the downward extension aforesaid, one or a plurality of inverted conical rings arranged inside said inner inverted cone and around said upright cone, a larger intermediate cone surrounding the aforementioned inverted inner cone and its extension, said larger intermediate cone having a downward extension and an outer and still larger cone surrounding the intermediate cone and forming at the outside thereof a conical passage, said outer cone having a downward extension terminating at a point above the lower end of the extension of the intermediate cone, as set forth.

2. In means for introducing and distributing mixtures of solids and liquid in settling or other vats or vessels, the combination with the vat or vessel, of an inner inverted cone arranged in the upper portion of the vessel and provided at its lower end with a downward extension and at its upper end with an upward extension, an upright cone arranged inside said inner inverted cone and forming at its base an annular passage leading to the downward extension aforesaid, one or a plurality of inverted conical rings arranged inside said inner inverted cone and around said upright cone, the innermost conical ring having an upward vertical extension, a larger intermediate cone surrounding the aforementioned inverted inner cone and its extension, said larger intermediate cone having a downward extension and an outer and still larger cone surrounding the intermediate cone and forming at the outside thereof a conical passage, said outer cone having a downward extension terminating at a point above the lower end of the extension of the intermediate cone, as set forth.

3. In means for introducing and distributing mixtures of solids and liquid in settling or other vats or vessels, the combination with the vat or vessel, of an inner inverted cone arranged in the upper portion of the vessel and provided at its lower end with a downward extension and at its upper end with an upward extension, an upright cone arranged inside said inner inverted cone and forming at its base an annular passage leading to the downward extension aforesaid, one or a plurality of inverted conical rings arranged inside said inner inverted cone and around said upright cone, the innermost conical ring having an upward vertical extension, a larger intermediate cone surrounding the aforementioned inverted inner cone and its extension, said larger intermediate cone having a downward extension at its lower end and an upward vertical extension at its upper end, a plurality of truncated settling cones between said inner and intermediate inverted cones, an outer and still larger cone surrounding the intermediate cone and forming at the outside thereof a conical passage, said outer cone having at its lower end a downward extension terminating at a point above the lower end of the extension of the intermediate cone and a vertical upward extension at its upper end extending to a greater height than the vertical upward extension on the intermediate cone, as set forth.

4. In means for introducing and distributing mixtures of solids and liquid in settling or other vats or vessels, the combination with the vat or vessel, of an inner inverted cone arranged in the upper portion of the vessel and provided with a downward extension, a larger intermediate cone surrounding the aforementioned inverted inner cone and its extension, said larger intermediate cone having a downward extension and an outer and still larger cone surrounding the intermediate cone and forming at the outside thereof a conical passage, said outer cone having a downward extension terminating at a point above the lower end of the extension of the intermediate cone, a central vertical shaft and helically disposed arms or blades upon said shaft for conveying the settled solids from the inner inverted cone through its extension to the interior of the intermediate cone and from the latter through its extension to the lower regions of the vessel and thence through the outlet at the bottom of the vessel, as set forth.

5. In means for introducing and distributing mixtures of solids and liquid in settling or other vats or vessels, the combination with the vat or vessel, of an inner inverted cone arranged in the upper portion of the vessel and provided with a downward extension, a larger intermediate cone surrounding the aforementioned inner cone and its extension, said larger intermediate cone having a downward extension, a plurality of inverted truncated settling cones arranged between said inner and intermediate inverted cones, a plurality of wide and narrow wing plates for supporting said inverted truncated settling cones from the intermediate cone, and an outer and still larger cone surrounding the intermediate cone and forming at the outside thereof a conical passage, said outer cone having a downward extension terminating at a point above the lower end of the extension of the intermediate cone, as set forth.

6. In means for introducing and distributing mixtures of solids and liquid in settling or other vats or vessels, the combination with the vat or vessel, of an inner inverted cone arranged in the upper portion of the vessel and provided with a downward extension, a larger intermediate cone surrounding the aforementioned inner cone and its extension, said larger intermediate cone having a downward extension, and an outer and still larger cone surrounding the intermediate cone and forming at the outside thereof a conical passage, said outer cone having a downward extension terminating at a point above the lower end of the extension of the intermediate cone, wing plates for supporting the outer and intermediate inverted cones from the interior of the vessel as set forth.

In testimony whereof I have signed my name to this specification in the presence of two subscribing witnesses.

ALEXANDER JOHN ARBUCKLE.

Witnesses:
 CHAS. OVENDALE,
 MAUD POPE.

Copies of this patent may be obtained for five cents each, by addressing the "Commissioner of Patents, Washington, D. C."